Sept. 22, 1931.        B. R. LITTLE        1,824,026
TUBE AND PIPE BENDER
Filed May 13, 1930        2 Sheets-Sheet 1
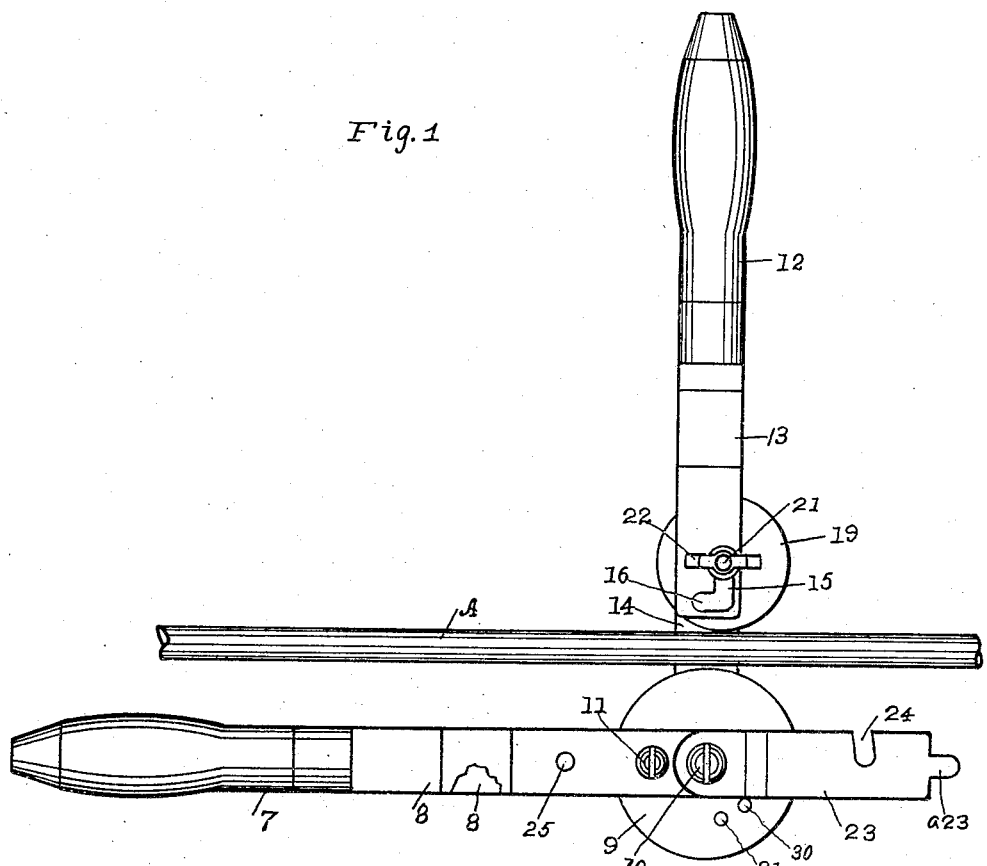
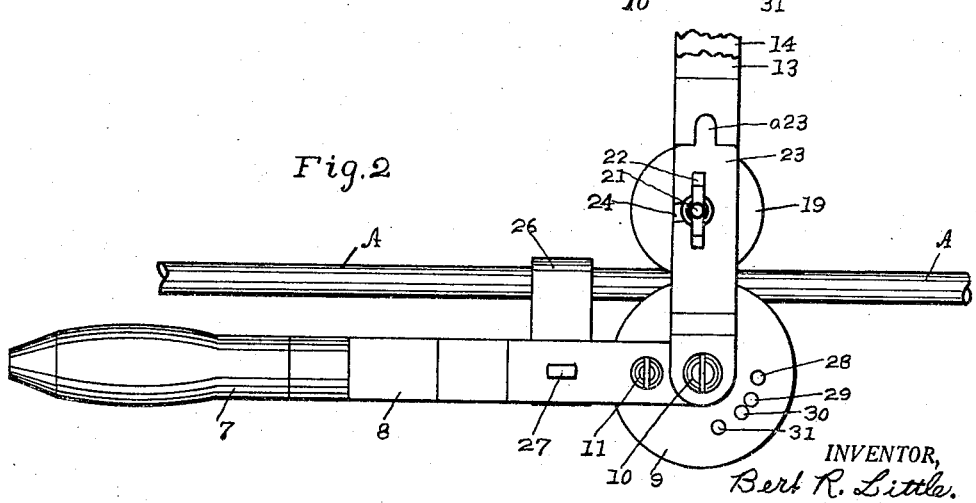
INVENTOR,
Bert R. Little.
BY David E. Lain,
ATTORNEY.

Sept. 22, 1931.  B. R. LITTLE  1,824,026
TUBE AND PIPE BENDER
Filed May 13, 1930   2 Sheets-Sheet 2
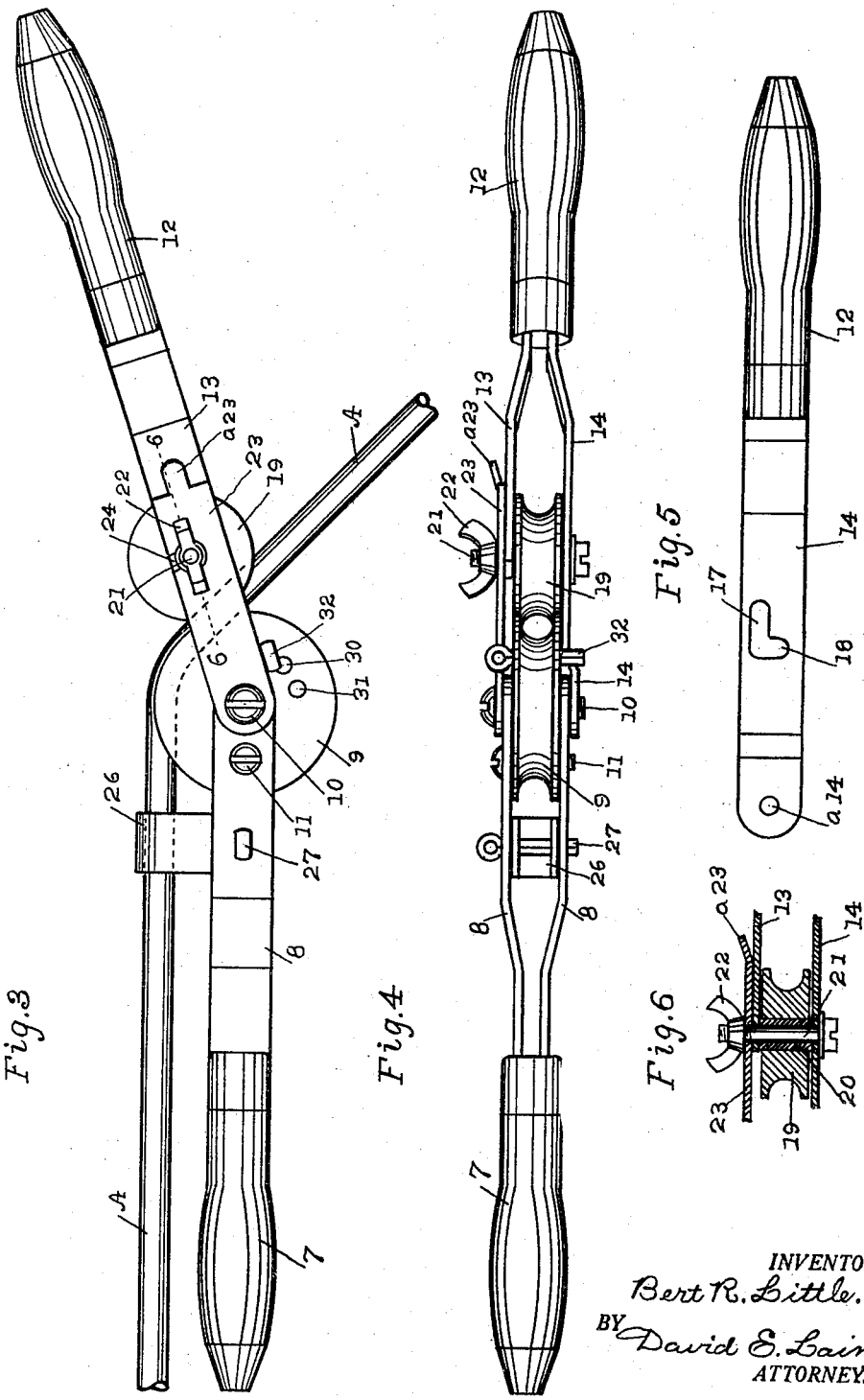
INVENTOR,
Bert R. Little.
BY David E. Lain,
ATTORNEY.

Patented Sept. 22, 1931

1,824,026

UNITED STATES PATENT OFFICE

BERT R. LITTLE, OF BELLINGHAM, WASHINGTON

TUBE AND PIPE BENDER

Application filed May 13, 1930. Serial No. 451,957.

My invention relates to improvements in tube and pipe benders and has for an object to provide a tube and pipe bender which can be opened to allow engagement with the tube or pipe without passing the same through the bender as usual.

Another object of my improvement is to provide a tube and pipe bender in which desired angularity of bends may be attained with accuracy without depending on the skill of the operative.

Another object of my improvement is to provide a tube and pipe bender of portable weight and design suitable to occupy a place in a pipe-fitter's kit for convenient use at the places of installation.

Other objects of my improvement will appear as the description proceeds.

I attain these and other objects of my improvement with the mechanism illustrated in the accompanying two sheets of drawings in which Figure 1 is a plan view of my tube and pipe bender shown as open and with a tube placed therein, Fig. 2 is a view similar to that of Fig. 1 with the bender closed and the tube therein in place for bending, Fig. 3 is a plan view of the bender and tube therein bent at an angle of 45°, Fig. 4 is a side elevation of Fig. 3 shown with the tube not included, Fig. 5 is a bottom plan view of the bending handle and arm shown separately, and Fig. 6 is a sectional view of a part of Fig. 3 on the line 6—6.

Similar characters refer to similar parts throughout. Certain parts are broken away to show other parts hidden thereby.

With more particular reference to the designated parts: Former handle 7 has bifurcated shank consisting of two members 8, 8 which are fastened to former block 9 by central screw bolt 10 and clamping screw bolt 11 both of which pass through registering openings in former block 9 and in shank members 8, 8, screw 11 being engaged in a threaded hole in one of shank members 8 and screw 10 passing also through latch 23 and being engaged in a threaded hole a14 in said shank member 14.

Bending handle 12 is fastened to its bifurcated shank which consists of shorter upper member 13 and longer lower member 14, the latter being engaged by screw bolt 10 in tapped hole a14 as stated. As best shown in Fig. 1, bending shank member 13 is too short to reach the forming block and has a transverse slot 16 adjacent its end which is intersected by a longitudinal slot 15. In lower bending shank member 14, as shown in Fig. 5, are intersecting slots 18 and 17 aligned with said slots 16 and 15 in member 13.

Bending wheel 19, see Fig. 6, has a central loose sleeve 20 which is mounted on screw bolt 21. Screw bolt 21 is extended through aligned slots 18, 17 and 16, 15 and mounts sleeve 20 between bending shank members 13 and 14.

Latch 23 has a hole near one end through which screw bolt 10 is extended and also has a segmental notch 24 in one edge disposed to engage screw bolt 21 when the latter is extended through slots 18 and 16. Sleeve 20 is extended beyond bending wheel 19 and when clamped between shank member 14 below and shank member 13 and latch 23 above by thumb nut 22 on bolt 21 the sleeve mounts bending wheel or roller 19 for revolution, as shown in Fig. 6. Latch 23 has lug a23 on its outer end which is preferably bent outward for a finger hold.

Arm shank members 8, 8 have aligned holes 25 therethrough and holding loop 26 is made to occupy the space between bars 8 to which it is fastened by cotter pin 27 extended through holes 25 and holes in loop 26 aligned therewith. Loop 26 is disposed for engagement with tube A to retain the tube in operative position in the bender and it is easily removable and replaceable by the use of cotter pin 27.

Four stop holes 28, 29, 30 and 31 in former block 9 are so disposed in the block that when a cotter pin 32 is placed in hole 28 the bending arm shank will contact therewith when the bending roll 19 has made a bend of 22½° in the tube, when the pin is placed in hole 29 the tube has been bent to an angle of 45° by roll 19 when the bending arm contacts with the pin, when the pin is in hole 30 the bending arm will contact therewith when the tube has been bent to an angle of 60°, and with the pin in hole 31 the bending arm will be stopped thereby when the bend in the tube has reached an angle of 90° and without the use of pin 32 handle 12 may be swung on bolt 10 till a return bend is made in tube A.

The illustrated locations of the stop holes provide for accurate bending of the usually required angles in the tubes or pipes. But holes may be placed in other locations in the former block to provide for accurate bending of the pipes to other desired angles. Also the bending arm may be stopped by the operative when the angle desired has been made in the pipe.

When using my tube and pipe bender an opening for the introduction of the tube or pipe therein is made by loosening thumb nut 22, turning latch 23 to its position in Fig. 1, placing bolt 21 in slots 15 and 17 and turning handle 12 to its position in Fig. 1 when there will be a space between the wheel and the former to receive the tube. Then engage loop 26 with the tube and fasten it to the former arm by pin 27, move bolt 21 into slots 16, 18 and engage notch 24 with bolt 21 and when nut 22 is turned down sleeve 20 will be clamped between shank members 13 and 14 and bending roll 19 will be properly mounted for revolution on the sleeve. Now the relative position of parts is illustrated in Fig. 2 and after placing pin 32 in hole 29 handle 12 is swung forward while handle 7 is firmly held till shank member 14 and latch 23 bears against pin 32 when tube A will have been bent at an angle of 45° over former 9. To remove the bender from the tube, pin 27 is withdrawn and loop 26 removed from the pipe or tube, handle 12 is swung back to its position shown in Figs. 1 and 2 and nut 22 is loosened allowing latch 23 to be swung to its position shown in Fig. 2 and roll 19 is moved to its position shown in Fig. 1 when the bender may be removed from the tube or vice versa.

In a similar manner bends of 22½, 60 or 90 degrees may be made in the tube or in a pipe by placing the same in the bender, closing the bender, placing pin 32 in the desired hole in block 9 and swinging handle 12 forward till stopped by pin 32. Then the pipe or tube may be removed from the bender by making the changes in the bender stated above.

Former block 9 is shown as a wheel in shape because of greater ease in making as compared to producing only the segment which is needed.

Provisions for bending several sizes of tubes and pipes may be made by providing suitable former blocks and bending rolls which may be mounted in the same former and bender arms.

Changes in structural details which require the principles of my illustrated bender to make them effective are also within the purview of this invention.

Having thus disclosed my invention, what I claim as new therein and desire to secure by Letters Patent is,—

1. A tube and pipe bender including a former block having a grooved arcuate edge, a former arm fastened to the former block, a bender arm, a bifurcated shank on the bender arm pivoted to the former block concentric with the arcuate edge thereof for oscillation, a grooved bender roll mounted for revolution on the bender arm shank between the members thereof in operative proximity to the arcuate edge of the former block, means providing for withdrawing the bender roll from close proximity to the former block, a latch included in one member of the bifurcated shank of the bender arm adapted to be opened to permit the admission of a tube laterally between the members of said bifurcated shank thereof, and means to retain the tube in operative position in the bender.

2. A tube and pipe bender including a former block having a grooved arcuate edge, a former arm fastened to the former block, a loop releasably fastened to the former arm to retain a tube in operative position when in the bender, a bender arm having a bifurcated shank including a longer shank member pivoted to one side of the bender block concentric with the arcuate edge thereof for oscillation having an angular slot therethrough consisting of a transverse slot and an intersecting longitudinal slot and a shorter shank member in the plane of the other side of the former block its inner end spaced apart from the former block to permit the passage of a tube laterally therebetween having an angular slot therethrough aligned with the angular slot in the longer shank member of the bender arm, a grooved bender roll having a central hole therethrough adapted for mounting between the shank members of the bender arm, an axle bolt having a head and a threaded end extended through the angular slot in the longer bender arm shank member through the central hole in the bender roll and through the angular slot in the shorter bender arm shank member, a latch one end of which is pivoted on the other side of the former block concentric with the arcuate edge thereof having a notch in one edge to engage the bender roll axle bolt when the bender roll is in operative proximity to the arcuate edge of the former block, and a nut on the threaded end of the axle bolt to retain the bolt in the transverse slots in the bender arm shank members to mount the bender roll in operative proximity to the arcuate edge of the former block.

BERT R. LITTLE.